US012583524B2

(12) United States Patent
Lingam et al.

(10) Patent No.: US 12,583,524 B2
(45) Date of Patent: Mar. 24, 2026

(54) LIGHTWEIGHT TRAILER WITH DEVELOPED CHASSIS

(71) Applicant: Kwik Equipment Sales LLC, Pearland, TX (US)

(72) Inventors: Pratap G. Lingam, Missouri City, TX (US); Nishanth Reddy Chandhupatla, Houston, TX (US); Anudeepjai Boggavarapu, Houston, TX (US)

(73) Assignee: Kwik Equipment Sales LLC, Pearland, TX (US)

( * ) Notice: Subject to any disclaimer, the term of this patent is extended or adjusted under 35 U.S.C. 154(b) by 0 days.

(21) Appl. No.: 18/774,731

(22) Filed: Jul. 16, 2024

(65) Prior Publication Data

US 2026/0021847 A1     Jan. 22, 2026

(51) Int. Cl.
  B62D 21/20       (2006.01)
  B60S 9/02        (2006.01)
  B62D 63/08       (2006.01)
(52) U.S. Cl.
  CPC ................ B62D 21/20 (2013.01); B60S 9/02 (2013.01); B62D 63/08 (2013.01)
(58) Field of Classification Search
  CPC ........ B62D 21/20; B62D 63/08; B62D 21/02; B62D 21/03; B62D 21/152; B60S 9/02
  See application file for complete search history.

(56) References Cited

U.S. PATENT DOCUMENTS

| | | | | | |
|---|---|---|---|---|---|
| 1,493,736 | A | * | 5/1924 | Collins ................. | B62D 21/02 |
| | | | | | 280/796 |
| 1,524,307 | A | * | 1/1925 | Perin ..................... | B62D 21/02 |
| | | | | | 410/77 |
| 1,795,938 | A | * | 3/1931 | Dykstra ................ | B62D 21/02 |
| | | | | | 280/783 |

(Continued)

FOREIGN PATENT DOCUMENTS

| | | | | |
|---|---|---|---|---|
| DE | 202012012603 U1 | * | 9/2013 | ............. B62D 21/02 |
| EP | 3744617 A1 | * | 12/2020 | ............. B62D 21/02 |

(Continued)

OTHER PUBLICATIONS

Author Unknown , Vehicle Frame, Aug. 1, 2013, EPO, DE 202012012603 U1, Machine Translation of Description (Year: 2013).*

*Primary Examiner* — Paul N Dickson
*Assistant Examiner* — Matthew D Lee
(74) *Attorney, Agent, or Firm* — Hogan Lovells US LLP

(57)          ABSTRACT

A lightweight trailer includes a front and rear of the trailer, and a chassis. The trailer also includes landing gear, wherein the landing gear may be in a deployed or undeployed state, suspension axles, wheels, and tires. The chassis of the trailer includes a first beam extending from the front of the trailer to the rear of the trailer, wherein the first beam comprises an I-beam cross-sectional shape, a second beam extending from the front of the trailer to the rear of the trailer, wherein the second beam comprises an I-beam cross-sectional shape, and cross-members perpendicular to the first beam and the (Continued)

second beam, wherein the cross-members are placed between the first beam and the second beam, and wherein the cross-members extend from the front of the trailer to the rear of the trailer.

17 Claims, 5 Drawing Sheets

(56) References Cited

U.S. PATENT DOCUMENTS

| | | | | | |
|---|---|---|---|---|---|
| 4,147,379 | A | * | 4/1979 | Winslow ................ | B62D 21/02 |
| | | | | | 280/799 |
| 5,482,356 | A | * | 1/1996 | Goodson, Jr. .......... | B62D 21/20 |
| | | | | | 298/17 R |
| 10,370,033 | B1 | * | 8/2019 | Klein ..................... | B62D 21/20 |
| 2007/0007759 | A1 | * | 1/2007 | Lemmons .............. | B62D 33/02 |
| | | | | | 280/789 |
| 2007/0241587 | A1 | * | 10/2007 | Fleming ................. | B62D 21/02 |
| | | | | | 296/203.01 |
| 2010/0207371 | A1 | * | 8/2010 | Van Houdt ............ | B60D 1/155 |
| | | | | | 280/796 |
| 2013/0300097 | A1 | * | 11/2013 | Garceau .............. | B62D 27/023 |
| | | | | | 280/789 |
| 2016/0114716 | A1 | * | 4/2016 | McKibben ............. | B62D 21/20 |
| | | | | | 280/433 |
| 2023/0098463 | A1 | * | 3/2023 | Snyder ................... | B60R 16/08 |
| | | | | | 296/156 |
| 2023/0322311 | A1 | * | 10/2023 | Awad ................... | B60P 1/6418 |

FOREIGN PATENT DOCUMENTS

| | | | | | |
|---|---|---|---|---|---|
| JP | 2017052425 | A | * | 3/2017 | |
| WO | WO-2019149971 | A1 | * | 8/2019 | .............. B60P 3/222 |

* cited by examiner

LIGHTWEIGHT TRAILER WITH DEVELOPED CHASSIS

BACKGROUND

1. Field of Disclosure

Embodiments of the present disclosure relate to trailer systems, and in particular, trailers for hauling containers.

2. Description of Related Art

Trailers are used in a variety of industries to haul loads behind vehicles, such as semi-trucks. Some of such loads include intermodal containers (often called shipping containers or ISO containers). ISO containers are a large standardized container that are hauled in different modes of transport, such as ship, rail, and truck. Accordingly, there is a need in the trucking industry for trailers that are designed to be able to efficiently and safely haul ISO containers via ground transportation. Trailers currently used in the industry have varying configurations, geometries, and weights, however there is a need for a lightweight trailer design that minimizes net weight without sacrificing structural integrity.

SUMMARY

Applicant recognized the problems noted above herein and conceived and developed embodiments of systems and methods, according to the present disclosure, for valve systems.

In an embodiment, a lightweight trailer includes a front of the trailer, a rear of the trailer, and a chassis. The chassis includes a first beam extending from the front of the trailer to the rear of the trailer, wherein the first beam comprises an I-beam cross-sectional shape, a second beam extending from the front of the trailer to the rear of the trailer, wherein the second beam comprises an I-beam cross-sectional shape, and one or more cross-members perpendicular to the first beam and the second beam, wherein the one or more cross-members are placed between the first beam and the second beam, and wherein the one or more cross-members extend from the front of the trailer to the rear of the trailer. The trailer also includes landing gear, wherein the landing gear may be in a deployed or undeployed state, one or more suspension axles, two or more wheels, and two or more tires.

In another embodiment, a lightweight trailer includes a front of the trailer, a rear of the trailer, and a chassis. The chassis includes a front bolster at the front of the trailer, a rear bolster at the rear of the trailer, and one or more cross-members, wherein the one or more cross-members extend from the front of the trailer to the rear of the trailer. The trailer also includes landing gear, wherein the landing gear may be in a deployed or undeployed state, one or more suspension axles, two or more wheels, and two or more tires.

In an embodiment, a lightweight trailer includes a chassis. The chassis includes a front beam section. The front beam section includes a front web height of about 4.5 inches, a front web thickness of about 8-gauge, a front flange width of about 4 inches, and a front flange thickness of about ¼ inch. The chassis also includes a middle beam section. The middle beam section includes a middle web height of about 6 inches, a middle web thickness of about ⅛ inch, a middle flange width of about 3 inches, and a middle flange thickness of about ¼ inch. The chassis further includes a rear beam section. The rear beam section includes a rear web height of about 10¹⁄₁₆ inches, a rear web thickness of about ⅛ inch, a rear flange width of about 3 inches, and a rear flange thickness of about ¼ inch. Additionally, the front beam section, the middle beam section, and the rear beam section together comprise a beam. The chassis also includes one or more cross-members, wherein the one or more cross-members are arranged perpendicular to the front beam section, the middle beam section, and the rear beam section. Furthermore, the chassis includes a front bolster. The front bolster includes a front bolster width of about 6 inches, a front bolster height of about 7.15 inches, and a front bolster thickness of about 8-gauge. Additionally, the chassis includes a rear bolster. The rear bolster includes one or more gussets, one or more stiffeners, one or more apertures, and one or more web components. The one or more web components of the rear bolster includes a web component height of about 10¹⁄₁₆ inches, a web component width of about 35¾ inches, and a web component thickness of about 3¹⁄₁₆ inches. Furthermore, the trailer includes landing gear, wherein the landing gear may be in a deployed or undeployed state, one or more suspension axles, two or more wheels, and two or more tires.

BRIEF DESCRIPTION OF DRAWINGS

The present technology will be better understood on reading the following detailed description of non-limiting embodiments thereof, and on examining the accompanying drawings, in which.

DETAILED DESCRIPTION

Figure 1A:
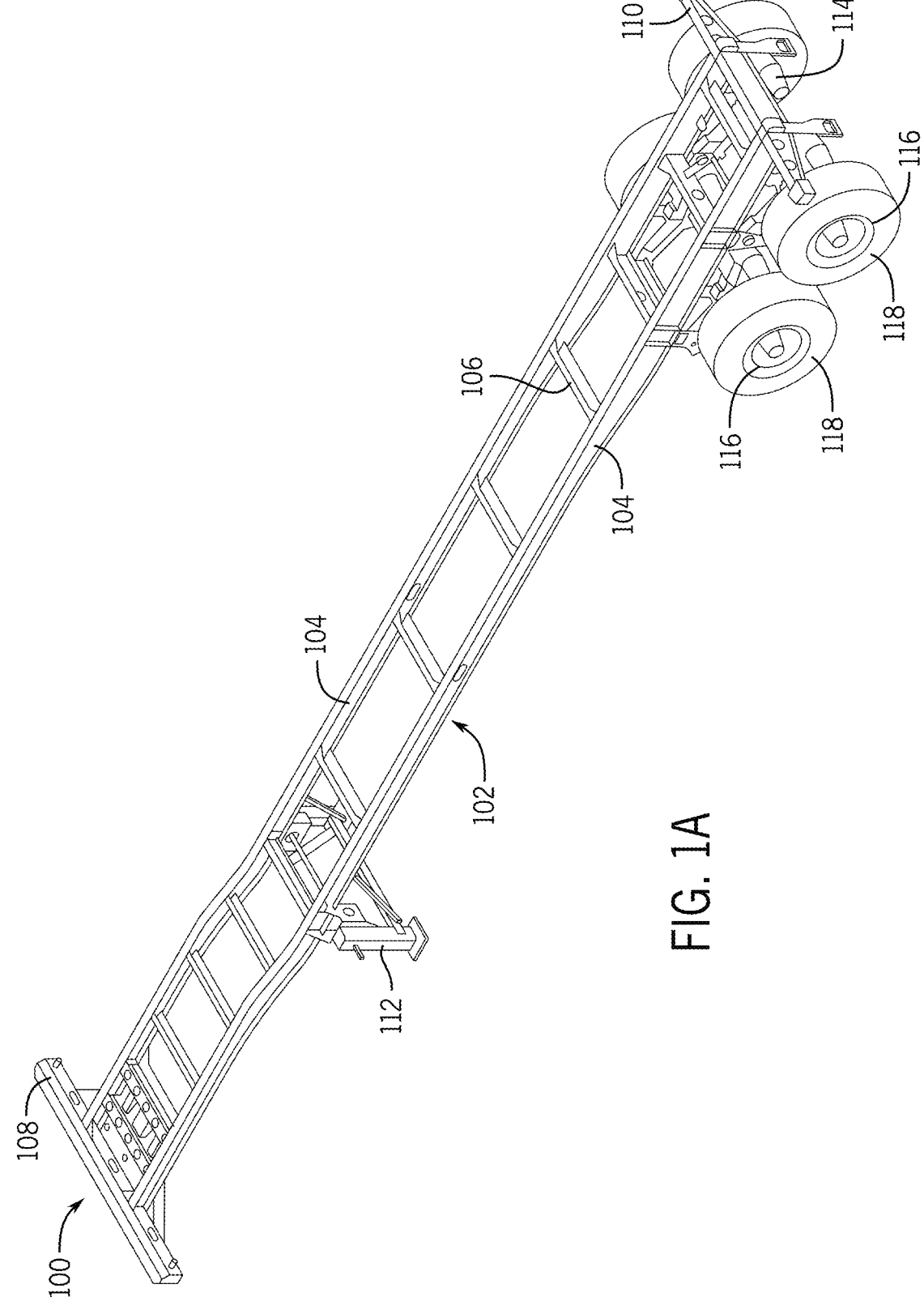
FIG. 1A is an isometric view of an embodiment of a trailer, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, like reference numerals may be used for like components, but such use should not be interpreted as limiting the disclosure.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Like numbers may be used to refer to like elements throughout, but it should be appreciated that using like numbers is for convenience and clarity and not intended to limit embodiments of the present disclosure. Moreover, references to "substantially" or "approximately" or "about" may refer to differences within ranges of +/−10 percent.

The trailer and chassis structure are designed to haul a standard 40 foot ISO container, while partially relying on the strength and integrity of the container itself. The embodiments contained herein minimize the net weight of the chassis without compromising on the combined structural integrity of the chassis and container combination. Many features were developed and optimized in embodiments of the trailer and chassis structure including various geometries, sizes, material properties, component thicknesses, types of operational components, number of operational components, and their cumulative combinations.

The trailer and chassis structure may be designed to carry a standard 40 foot shipping container weighing about 64000 lbs. However, it should be appreciated that the trailer and/or chassis structure may be designed to carry non-standard shipping There are many characteristics that contribute to the utility of the embodiments contained herein, such as: frame structure optimized by types of steel, with certain geometry of structural components utilized within each functional segment of the chassis; front and rear bolsters which are primary weight bearing elements of the chassis, and have been optimized to transfer the load in the container throughout the structure of the chassis; location and layout of landing gear are made to withstand total weight of a fully loaded container when the chassis is parked and not connector to a tractor/truck; and use of a suspension axle combination in a way to lower component weights and be particularly functional for regional highway use, among others.

FIG. 1A is an isometric view of an embodiment of a trailer 100. Various components have been removed for simplicity with the present discussion, but additional components may be used with the trailer 100. The illustrated trailer 100 includes a chassis 102. The chassis comprises one or more beams 104, one or more cross-members 106, a front bolster 108, and rear bolster 110. The illustrated chassis 102 of FIG. 1A includes two beams 104, however it should be appreciated that other designs of the chassis 102 of the trailer 100 may incorporate just one beam 104 or three or more beams 104. The number of beams 104 incorporated in the design may be dependent on the estimated load size of what the trailer 100 will be hauling. Additionally, increasing the number of beams 104 may increase the strength of the chassis 102 and trailer 100. The beams 104 may comprise different shapes, sizes, lengths, widths, heights, web thicknesses, and flange thicknesses. In an embodiment, the beams 104 comprise an I-beam cross-section. In an embodiment, the beams 104 comprise a reduced cross-sectional area may confer multiple benefits, such as a lower beam weight. In some embodiments, the beams 104 extend from the front of the trailer 100 to the rear of the trailer 100. In an embodiment, the beams 104 extend from the front bolster 108 to the rear bolster 110.

The illustrated chassis 102 of the trailer 100 also includes one or more cross-members 106. Such cross-members 106 used in the chassis 102 may comprise different shapes, sizes, lengths, widths, heights, web thicknesses, and flange thicknesses. The cross-members 106 may be positioned at different areas of the chassis 102 of the trailer 100. Due to the load profile on the trailer 100, cross-members 106 may be positioned closer or farther from each other throughout the chassis 102. For example, the cross-members 106 may be spaced closer together in areas of the chassis 102 and trailer 100 that require additional strength and/or stabilization. Additionally, the total number of cross-members 106 placed throughout the chassis 102 may vary depending on the estimated load size of what the trailer 100 will be hauling. Increasing the total number of cross-members 106 may increase the strength and/or stability of the chassis 102 and trailer 100. In an embodiment, the cross-members 106 comprise an I-beam shape. It should be appreciated that although the cross-members 106 of the chassis 102 are depicted in FIG. 1A as arranged perpendicularly to the beams 104, the cross-members 106 may be arranged oblique relative to the beams 104. Arranging the cross-members 106 at different angles relative to the beams 104 may provide certain benefits, such as additional stability or load-bearing capability of the chassis 102 and trailer 100. But similarly, the cross-members 106 arranged substantially perpendicular to the beams 104 may also provide certain benefits, such as additional stability or load-bearing capability of the chassis 102 and trailer 100. Additionally, arranging the cross-members 106 either oblique to or perpendicular to the beams 104 may provide differing cost-reduction benefits in the production of the chassis 102 and trailer 100 due to less materials being used or ease of assembly.

The illustrated chassis 102 of the trailer 100 also includes the front bolster 108 and the rear bolster 110 that is part of the chassis 102. The front bolster 108 may be designed to secure a container (not depicted), such as an ISO container, in the cases of acceleration and braking. The front bolster 108 may prevent the container from shifting, sliding, or tipping on the chassis 102 or trailer 100 when trailer is being hauled. In an embodiment, the front bolster 108 comprises a "C" cross-sectional shape, the cross-section of which may be reduced to reduce the overall weight of the front bolster 108. Similar to the front bolster 108, the rear bolster 110 comprises an I-beam cross sectional shape. The rear bolster 110 similarly may be designed to secure the container (e.g.

an ISO container) in the cases of acceleration and braking. Similar to the front bolster 108, the rear bolster 110 may prevent the container from shifting, sliding, or tipping on the chassis 102 or trailer 100 when the trailer is being hauled. Additionally, the rear bolster 110 may be designed to transfer the load of the container down to the suspensions, springs, axles, wheels, and tires. In an embodiment, the rear bolster 110 comprises an I-beam cross-sectional shape, the cross-section of which may be reduced to reduce the overall weight of the rear bolster 110. In another embodiment, the rear bolster 110 comprises an I-beam shape with additional reinforcement that, at least in part, allows the load of the container on the chassis 102 and trailer 100 to be transferred down to the suspensions, springs, axles, wheels, and tires.

The chassis 102 may also include dock bumpers that are structural members that act as impact pads for the chassis 102 during rear docking applications. The dock bumpers may be designed to take impact while a driver of the trailer 100 is backing up the chassis 102 to a dock for loading and unloading purposes. The dock bumpers may have a width of about 4 inches, a length of about 2 inches, and a height of about 9/16 inches. The dock bumpers may also have a weight of about 2.80 lbs. each.

In some embodiments, attached to the chassis 102 of the trailer 100 is landing gear 112. The landing gear 112 may be in a deployed or undeployed state. As illustrated in FIG. 1A, the landing gear 112 is deployed in this embodiment. Deployment of the landing gear 112 while a container is on the trailer 100 may allow the load of the container to be transferred from the chassis 102 down to the ground. The landing gear 112 may be undeployed for example when the trailer 100 is hooked up to a truck or tractor (not depicted) for hauling, in which case at least a part of the load of the container is transferred to the truck instead of transferred directly to the ground via the landing gear 112. In an embodiment, the landing gear 112 is attached to the beams 104 of the chassis 102. In another embodiment, the landing gear 112 is also attached to one or more cross-members 106 of the chassis 102. In some embodiments, the landing gear 112 is attached to the beams 104 and positioned to align with one or more cross-member 106, which may function to reinforce the chassis 102 and effectively transfer the load of the container down to the ground. The landing gear 112 may also be reinforced with additional weight and material to the structure of the landing gear 112.

Also depicted in FIG. 1A are suspension axles 114. In the illustrated embodiment, there are two suspension axles 114, however there may only be one suspension axle 114 or three or more suspension axles 114 based in part on the estimated load size that will be hauled by the trailer 100. More suspension axles 114 may allow the trailer 100 to carry more weight. Additionally, the type of suspension axles 114 installed in the trailer 100 may depend on the estimated load size that the trailer 100 will be carrying. For example, suspension axles 114 may in total be rated to carry 50,000 lbs., or 25,000 lbs. per axle in the case of two suspension axels 114 in the trailer 100. In some embodiments, the suspension axles 114 are positioned to align with one or more cross-members 106, which may allow for more effective load transfer of the container on the trailer 100 down to the ground.

In some embodiments, the trailer 100 may also comprise one or more wheels 116 and/or one or more tires 118. The diameter and thickness of the wheels 116 may vary depending on a multitude of factors, such as expected total load weight on the trailer 100, load bearing shifts on the trailer 100, road quality that the trailer 100 will be traveling on, among other factors. The diameter, thickness, and treat depth of the tires 118 may also vary depending on a multitude of factors, such as expected total load weight on the trailer 100, load bearing shifts on the trailer 100, weather, road quality that the trailer 100 will be traveling on, among other factors. In some embodiments of the trailer 100, chassis 102, beams 104, cross-members 106, landing gear 112, and wheels 116 are made out of a metal or metal alloy, and the tires 118 are made out of a type of rubber.

Figures 1B, 1C:
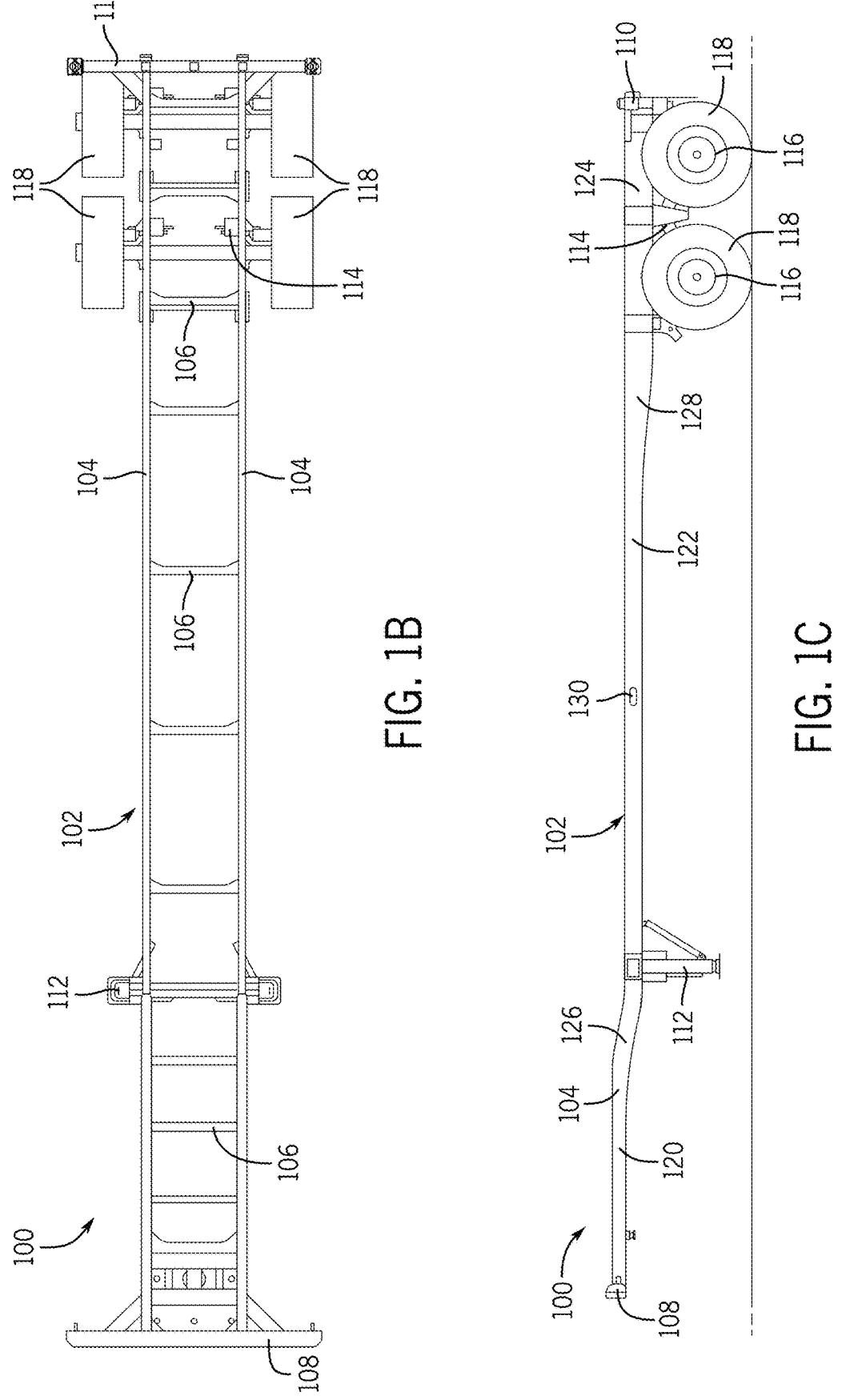
FIG. 1B is a top view of an embodiment of a trailer, in accordance with embodiments of the present disclosure.
FIG. 1C is a side view of an embodiment of a trailer, in accordance with embodiments of the present disclosure.

FIG. 1B is a top view of an embodiment of the trailer 100, which shares several similar features with the trailer 100 of FIG. 1A, such as the beams 104, cross-members 106, rear bolster 110, tires 118, and others, which will be identified with like reference numerals for convenience purposes only and not to limit the scope of the present disclosure. Various components may have been removed for simplicity with the present discussion, but additional components may be used with the trailer 100.

FIG. 1B particularly illustrates the spacing, size, and arrangement of the cross-members 106 used in the chassis 102. As can be seen in the illustration, the cross-members 106 may be positioned at different areas of the chassis 102 of the trailer 100. Furthermore, the cross-members 106 may be different shapes and sizes. As can be seen in the embodiment depicted in FIG. 1B, the cross-members 106 near the rear bolster 110, suspension axels 114, and tires 118 are wider and a different shape than the cross-members 106 near the front bolster 108. The wider or different shaped cross-members 106 may provide certain benefits such as increased load-bearing capability or stability of the chassis 102 and trailer 100.

As discussed herein, and particularly illustrated in FIG. 1B, due to the load profile on the trailer 100, cross-members 106 may be positioned closer or farther from each other throughout the chassis 102. For example, the cross-members 106 may be spaced closer together in areas of the chassis 102 and trailer 100 that require additional strength and/or stabilization. Additionally, the total number of cross-members 106 placed throughout the chassis 102 may vary depending on the estimated load size of what the trailer 100 will be hauling. Increasing the total number of cross-members 106 may increase the strength and/or stability of the chassis 102 and trailer 100. In an embodiment, the cross-members 106 comprise an I-beam shape. It should be appreciated that although the cross-members 106 of the chassis 102 are depicted in FIG. 1A as arranged perpendicularly to the beams 104, the cross-members 106 may be arranged oblique relative to the beams 104. Arranging the cross-members 106 at different angles relative to the beams 104 may provide certain benefits, such as additional stability or load-bearing capability of the chassis 102 and trailer 100. But similarly, the cross-members 106 arranged substantially perpendicular to the beams 104 may also provide certain benefits, such as additional stability or load-bearing capability of the chassis 102 and trailer 100. Additionally, arranging the cross-members 106 either oblique to or perpendicular to the beams 104 may provide differing cost-reduction benefits in the production of the chassis 102 and trailer 100 due to less materials being used or ease of assembly.

FIG. 1C is a side view of an embodiment of the trailer 100, which shares several similar features with the trailer 100 of FIG. 1A and FIG. 1B, such as the beams 104, front bolster 108, rear bolster 110, tires 118, and others, which will be identified with like reference numerals for convenience purposes only and not to limit the scope of the present disclosure. Various components may have been removed for simplicity with the present discussion, but additional components may be used with the trailer 100.

Also illustrated in FIG. 1C are a front beam section 120, middle beam section 122, and rear beam section 124 that comprise the beam 104. As illustrated, the front beam section 120, middle beam section 122, and rear beam section 124 have different heights and lengths, however the beam sections 120, 122, 124 may be designed to be the same height and/or length, depending on a variety of factors such as the load weight, load size, and various cost or materials considerations during production. In an embodiment, the front beam section 120 is vertically higher off the ground than (i.e. it is offset from) the middle beam section 122 and rear beam section 124 and accordingly, in this embodiment, the beam sections 120, 122, 124 do not form a flat surface on the top side of the trailer 100. Also in this embodiment, the front beam section 120 is designed to support the tunnel section of an ISO container (not depicted) whereas the middle beam section 122 and rear beam section 124 are designed to support the other surface area on the bottom of the ISO container (also not depicted). However, it should be appreciated that some types of containers may not comprise a tunnel section, in which case the beam sections 120, 122, 124 may be designed to form a flat surface for the container to lay upon. In some embodiments, the front, middle, and rear beam sections 120, 122, 124 are joined by ⅛ inch pads on either side of the beam 104.

The trailer 100 of FIG. 1C may also contain a front angled beam section 126 and a rear angled beam section 128. The front angled beam section 126 may be implemented into the beam 104 of the chassis 102 when the web height of the front beam section 120 and the web height of the middle beam section 122 are different. Similarly, the rear angled beam section 128 may be implemented into the beam 104 of the chassis 102 when the web height of the middle beam section 122 and the web height of the rear beam section 124 are different. It should be appreciated that the front angled beam section 126 serves as a transition beam section that is positioned between the front beam section 120 and the middle beam section 122, and the rear angled beam section 128 serves as a transition beam section that is positioned between the middle beam section 122 and the rear beam section 124. It should also be appreciated that the front angled beam section 126 and the rear angled beam section 128 may not be implemented into embodiments of the trailer 100 in which the trailer 100 is being designed to carry a flat container and therefore the beam sections 120, 122, 124 form a flat surface (i.e. the three beam sections are parallel). In an embodiment, the front angled beam section 126 allows the beam 104 to raise to a height above the ground so that the front beam section 120 is able to make contact with the tunnel section of an ISO container (not depicted).

In another embodiment, there may only be two beam sections per beam 104, such as a front beam section 120 and a rear beam section 124, in which case there may only be one angled beam section 126 between the front beam section 120 and the rear beam section 124. As described above, the angled beam section 126 would function as a transition section between the front beam section 120 and the rear beam section 124.

As further depicted in FIG. 1C, one or more beams 104 may comprise one or more apertures 130. It should be appreciated that although the embodiment illustrated in FIG. 1C has a single aperture 130, there may be two or more apertures 130 in the beams 104. More apertures 130 may decrease the weight of the beams 104, but may decrease strength and load bearing capacity of the trailer 100. In some embodiments, the aperture 130 can be used in conjunction with a type of fastener (not depicted) to secure the load to the trailer 100.

Figure 1F:
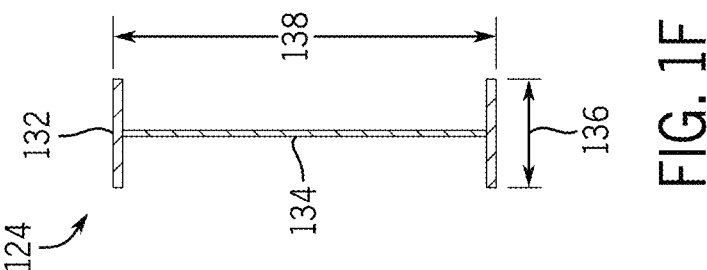
FIG. 1F is a front view of an embodiment of a rear beam section of a trailer, in accordance with embodiments of the present disclosure.
Figure 1E:
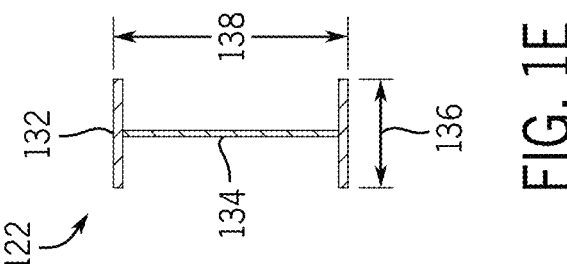
FIG. 1E is a front view of an embodiment of a middle beam section of a trailer, in accordance with embodiments of the present disclosure.
Figure 1D:
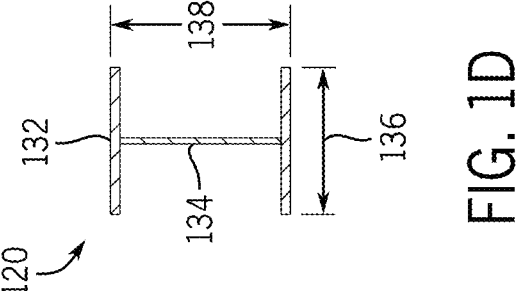
FIG. 1D is a front view of an embodiment of a front beam section of a trailer, in accordance with embodiments of the present disclosure.

FIG. 1D is a front view of an embodiment of the front beam section 120 of an embodiment of the beam 104 of the trailer 100. In this embodiment, the front beam section 120 comprises a flange 132 and a web 134. The flange 132 has a flange width 136 and the web 134 has a web height 138. Increasing or decreasing the flange width 136 may have various benefits such as increasing or decreasing container stability on the trailer 100, increasing or decreasing total tare weight, or increasing or decreasing load bearing capability of the trailer 100. Similarly, increasing or decreasing the web height 138 may have various benefits such as increasing or decreasing container stability on the trailer 100, increasing or decreasing total tare weight, or increasing or decreasing load bearing capability of the trailer 100. The flange 132 may be of varying thicknesses, which may provide certain benefits such as increased yield strength and/or increased stability or load bearing capability of the trailer 100 overall. The web 134 may also be of varying thicknesses, which also may provide certain benefits such as increased yield strength and/or increased stability or load bearing capability of the front beam section 120 and the trailer 100 overall.

In an embodiment, the front beam section 120 comprises webs 134 that are about 8-gauge thick with web height 138 varying from about 4.5 inches to about 6 inches (175 KSI yield strength). In this embodiment, the front beam section 120 also comprises flanges 132 that are about ¼ inches thick with flange width 136 of about 4 inches. In another embodiment, the front beam section 120 comprises webs 134 that are about 8-gauge thick with web height 138 of about 4.5 inches. In this embodiment, the front beam section 120 also comprises flanges 132 that are about ¼ inches thick with flange width 136 of about 4 inches. These embodiments may confer certain benefits, such as comprising a reduced cross-sectional area that reduces the overall weight of the beam 104.

FIG. 1E is a front view of an embodiment of the middle beam section 122 of an embodiment of the beam 104 of the trailer 100. In this embodiment, similar to the front beam section 120, the middle beam section 122 comprises a flange 132 and a web 134. The flange 132 has a flange width 136 and the web 134 has a web height 138. Increasing or decreasing the flange width 136 may have various benefits such as increasing or decreasing container stability on the trailer 100, increasing or decreasing total tare weight, or increasing or decreasing load bearing capability of the trailer 100. Similarly, increasing or decreasing the web height 138 may have various benefits such as increasing or decreasing container stability on the trailer 100, increasing or decreasing total tare weight, or increasing or decreasing load bearing capability of the trailer 100. The flange 132 may be of varying thicknesses, which may provide certain benefits such as increased yield strength and/or increased stability or load bearing capability of the trailer 100 overall. The web 134 may also be of varying thicknesses, which also may provide certain benefits such as increased yield strength and/or increased stability or load bearing capability of the middle beam section 122 and the trailer 100 overall.

In an embodiment, the middle beam section 122 comprises webs 134 that are about ⅛ inches thick with web height 138 varying from about 6 inches to about 10 1/16 inches. In this embodiment, the middle beam section 122 also comprises flanges 132 that are about ¼ inches thick with flange width 136 of about 3 inches. This embodiment may confer certain benefits, such as comprising a reduced cross-sectional area that reduces the overall weight of the beam 104.

In another embodiment, the middle beam section 122 comprises webs 134 that are about ⅛ inches thick with web height 138 of about 6 inches. In this embodiment, the middle beam section 122 also comprises flanges 132 that are about ¼ inches thick with flange width 136 of about 3 inches.

In yet another embodiment, the web height 138 of the middle beam section 122 is larger than the web height 138 of the front beam section 120, and the flange width 136 of the middle beam section 122 is less than the flange width 136 of the front beam section 120.

FIG. 1F is a front view of an embodiment of the rear beam section 124 of an embodiment of the beam 104 of the trailer 100. In this embodiment, similar to the front beam section 120 and the middle beam section 122, the rear beam section 124 comprises a flange 132 and a web 134. The flange 132 has a flange width 136 and the web 134 has a web height 138. Increasing or decreasing the flange width 136 may have various benefits such as increasing or decreasing container stability on the trailer 100, increasing or decreasing total tare weight, or increasing or decreasing load bearing capability of the trailer 100. Similarly, increasing or decreasing the web height 138 may have various benefits such as increasing or decreasing container stability on the trailer 100, increasing or decreasing total tare weight, or increasing or decreasing load bearing capability of the trailer 100. The flange 132 may be of varying thicknesses, which may provide certain benefits such as increased yield strength and/or increased stability or load bearing capability of the rear beam section 124 and the trailer 100 overall. The web 134 may also be of varying thicknesses, which also may provide certain benefits such as increased yield strength and/or increased stability or load bearing capability of the trailer 100 overall.

In an embodiment, the rear beam section 124 comprises webs 134 that are about ⅛ inches thick with web height 138 varying from about 6 inches to about 10 1/16 inches. In this embodiment, the rear beam section 124 also comprises flanges 132 that are about ¼ inches thick with flange width 136 of about 3 inches. In an embodiment, the web height 138 of the rear beam section 124 is greater than the web height 138 of the front beam section 120, and the flange width 136 of the rear beam section 124 is less than the flange width 136 of the front beam section 120. This embodiment may confer certain benefits, such as comprising a reduced cross-sectional area that reduces the overall weight of the beam 104. In another embodiment, the rear beam section 124 comprises webs 134 that are about ¼ inches thick with web height 138 of about 10¾ inches. In such embodiment, the rear beam section 124 also comprises flanges 132 that are about ¼ inches thick with flange width 136 of about 4 inches.

In some embodiments, the trailer 100 may comprise beams 104 that only have a front beam section 120 and a rear beam section 124, that can also be referred to as a first beam section and a second beam section. In such embodiments, the first beam section may have the dimensions of the front beam section 120 and the second beam section may have the dimensions of the rear beam section 124. Accordingly, in such embodiments, the first beam section 120 comprises webs 134 that are about 8-gauge thick with web height 138 varying from about 4.5 inches to about 6 inches (175 KSI yield strength). In this embodiment, the front beam section 120 also comprises flanges 132 that are about ¼ inches thick with flange width 136 of about 4 inches. Additionally, the second beam section 124 comprises webs 134 that are about ⅛ inches thick with web height 138 from about 6 inches to about 10 1/16 inches. In this embodiment, the rear beam section 124 also comprises flanges 132 that are about ¼ inches thick with flange width 136 of about 3 inches.

In an embodiment, the rear beam section 124 comprises webs 134 that are about ⅛ inches thick with web height 138 of about 10 1/16 inches. In this embodiment, the rear beam section 124 also comprises flanges 132 that are about ¼ inches thick with flange width 136 of about 3 inches.

In some embodiments, the front beam section 120, the middle beam section 122, and the rear beam section 124 may have webs 134 that are made of high tensile strength steel of about 110 KSI yield strength. Additionally, the front beam section 120, the middle beam section 122, and the rear beam section 124 may have flanges 132 that are made of high tensile strength steel of about 130 KSI yield strength. However, it should be appreciated that any reasonable high tensile strength steel may be suitable for the webs 134 and the flanges 132 of the beam sections 120, 122, 124.

Figures 2A, 2B, 2C, 2D:
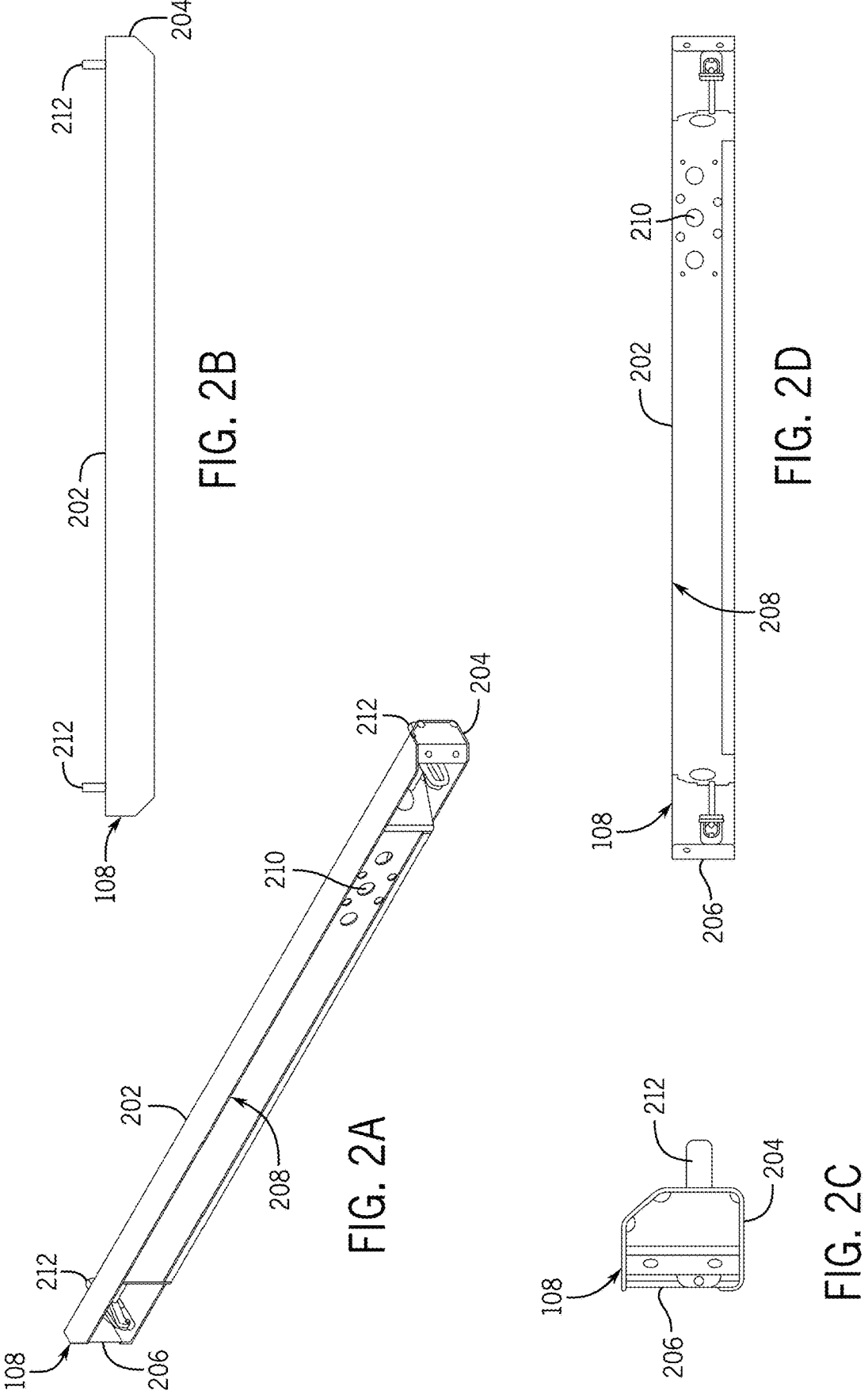
FIG. 2A is an isometric view of an embodiment of a front bolster of a trailer, in accordance with embodiments of the present disclosure.
FIG. 2B is a top view of an embodiment of a front bolster of a trailer, in accordance with embodiments of the present disclosure.
FIG. 2C is a side view of an embodiment of a front bolster of a trailer, in accordance with embodiments of the present disclosure.
FIG. 2D is a front view of an embodiment of a front bolster of a trailer, in accordance with embodiments of the present disclosure.

FIG. 2A is an isometric view of an embodiment of the front bolster 108 of the trailer 100. The front bolster 208 is part of the structure of the chassis 102. The front bolster 108 supports the container (not depicted) in the cases of acceleration and braking of the trailer 100. The front bolster 108 also attaches to the beams 104, which may be accomplished via one or more of bolts, gussets, stabilizers, or welding. The front bolster 108 comprises a front bolster length 202, width 204, and height 206. Various lengths 202, widths 204, and height 206 of the front bolster 108 may be used, which may depend on the shape and size of the chassis 102 and beams 104. The front bolster length 202 may also coincide with the width of the container that the trailer 100 is carrying. Generally, as the length 202, width 204, and height 206 of the front bolster 108 decrease, the total cost of producing the front bolster 108 decreases. However, it should be appreciated that larger lengths 202, widths 204, and/or heights 206 of the front bolster 108 may increase the stability and security of the container atop the trailer 100, which may increase trailer safety, however, this increasing these may also increase the tare weight of the trailer 100.

The front bolster 108 also comprises a front bolster thickness 208. Increasing the front bolster thickness 208 may increase the tare weight of the trailer 100. The front bolster 108 also comprises various apertures 210. One purpose of the apertures 210 is to decrease the total weight of the front bolster 108 by allowing the front bolster 108 to comprise less material. Other purposes of the apertures 210 may include allowing fastening means to attach to the front bolster 108 that may be used to secure the container, as well as increasing aerodynamics of the trailer 100. The apertures 210 may be different shapes and sizes. It should be appreciated that the illustrated apertures 210 of FIG. 2A are circles of different sizes, however these apertures may instead be slits, ovals, rectangles, or any other type of geometries, or any combination thereof.

Furthermore, the front bolster 108 may comprise fasteners 212. The fasteners 212 may assist in securing the front bolster 108 to the chassis 102 and/or the beams 104. The fasteners 212 may be one or more bolts, which would be removable such as through a threaded connection to an associated nut (or female connection) in the chassis 102 and/or the beams 104. The fasteners 212 may instead be designed to be permanently welded to the chassis 102 and/or the beams 104.

In some embodiments, the front bolster thickness 208 is about 8-gauge thick. In an embodiment, the width 204 of the front bolster 108 is about 6 inches, the height 206 of the front bolster 108 is about 7.15 inches, and the front bolster thickness 208 is about 8-gauge. In some embodiments, the front bolster 108 and fasteners 212 are made out of a metal or metal alloy. In another embodiment, the front bolster 108 has front bolster thickness 208 of about 8-gauge, width 204 of about 6 inches, height 206 of about 7 inches, and length 202 of about 96 inches. Additionally the front bolster 108 may be made of high tensile strength steel of about 110 KSI yield strength. However, it should be appreciated that any reasonable high tensile strength steel may be suitable for the front bolster 108.

FIG. 2B is a top view of the embodiment of the front bolster 108 of the trailer 100, which shares some similar features with FIG. 2A, which will be identified with like reference numerals for convenience purposes only and not to limit the scope of the present disclosure. Various components may have been removed for simplicity with the present discussion, but additional components may be used with the front bolster 108.

FIG. 2C is a side view of the embodiment of the front bolster 108 of the trailer 100, which shares some similar features with FIG. 2A and FIG. 2B, which will be identified with like reference numerals for convenience purposes only and not to limit the scope of the present disclosure. Various components may have been removed for simplicity with the present discussion, but additional components may be used with the front bolster 108.

FIG. 2D is a front view of the embodiment of the front bolster 108 of the trailer 100, which shares some similar features with FIG. 2A, FIG. 2B, and FIG. 2C, which will be identified with like reference numerals for convenience purposes only and not to limit the scope of the present disclosure. Various components may have been removed for simplicity with the present discussion, but additional components may be used with the front bolster 108.

Figures 3A, 3B:
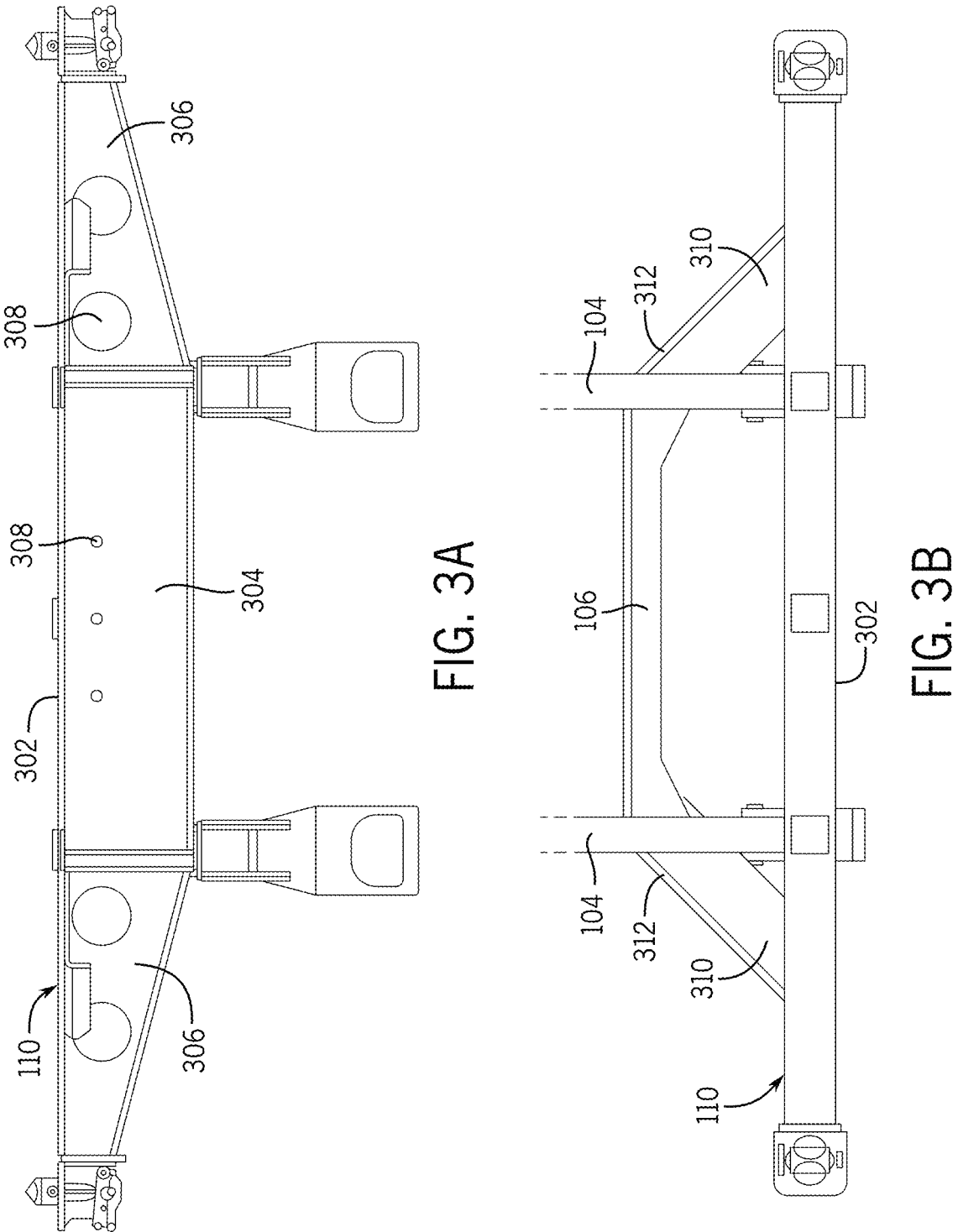
FIG. 3A is a back view of an embodiment of a rear bolster of a trailer, in accordance with embodiments of the present disclosure.
FIG. 3B is a top view of an embodiment of a rear bolster of a trailer, in accordance with embodiments of the present disclosure.

FIG. 3A is a rear view of an embodiment of a rear bolster 110 of the trailer 100. The rear bolster 110 of FIG. 3A is referenced with a like reference numeral as FIG. 1A, FIG. 1B, and FIG. 1C for convenience purposes only and not to limit the scope of the present disclosure. Various components may have been removed for simplicity with the present discussion, but additional components may be used with the rear bolster 110.

As mentioned, the rear bolster 110 is part of the structure of the chassis 102 of the trailer 100 and be fastened to the chassis 102 and/or beams 104 using fasteners (not depicted) that may be of the bolt and nut variety or permanently attached, such as via welding. As with the front bolster 108, the rear bolster 110 supports the container (not depicted) in the case of acceleration and braking of the trailer 100. The rear bolster 110 also assists in transferring the load of the container down to the suspension axels 114, wheels 116, and tires 118 (not depicted). The rear bolster 110 comprises a rear bolster length 302, which may be longer or shorter than the front bolster length 202. The rear bolster length 302 may also depend on the width of the container that the trailer 100 is carrying.

The rear bolster 110 also comprises a one or more web components 304, 306. The web components 304, 306 may increase the stability of the chassis 102 and also facilitate the ability of the rear bolster 210 to transfer the load of the container to the suspension axels 114. As illustrated in FIG. 3A, there is a middle web component 304 and two side web components 306. Here, the middle web component 304 is positioned between the beams 104 (not depicted) and the side web components 306 are positioned on the outside of the beams 104. However, it should be appreciated that there may only be a single web component, two web components, or four or more web components, and the web components 304, 306 may be positioned at different positions relative to the beams 104 (not depicted). Within the web components 304, 306, there may be one or more apertures 308. Similar to the apertures 210 of the front bolster 108, the apertures 308 of the web components 304, 306 may decrease the total weight of the rear bolster 110 by allowing the rear bolster 110 to comprise less material (typically a type of metal). Other purposes of the apertures 308 may include allowing fastening means to attach to the rear bolster 110 that may be used to secure the container, as well as increasing aerodynamics of the trailer 100. The apertures 308 may be different shapes and sizes. It should be appreciated that the illustrated apertures 308 of FIG. 2A are circles of different sizes, however these apertures may instead be slits, ovals, rectangles, or any other type of geometries, or any combination thereof.

FIG. 3B is a top view of the embodiment of the rear bolster 110 of the trailer 100, which shares several similar features of the trailer 100 of FIG. 1A and/or the rear bolster 110 of FIG. 3A, such as the beams 104, cross members 106, and rear bolster length 302, which will be identified with like reference numerals for convenience purposes only and not to limit the scope of the present disclosure. Various components may have been removed for simplicity with the present discussion, but additional components may be used with the rear bolster 110.

As illustrated in FIG. 3B, the rear bolster 110 also has gussets 310 and stiffeners 312. The gussets 310 function by connecting the rear bolster 110 to one or more beams 104 and the stiffeners attach to the gussets 310 and also connect the rear bolster 110 to one or more beams 104. It should be appreciated that in FIG. 3B, there are two gussets 310 and two stiffeners 312, however there may be any number of gussets 310 and stiffeners 312 included with the rear bolster 110. Increasing the number of gussets 310 and stiffeners 312 may increase the stability and load bearing capability of the chassis 102 and trailer 100, but also may increase the total tare weight of the trailer 100 and may also increase costs of producing the trailer 100. In an embodiment, the stiffeners 312 are about ½ inch thick and about 4 inches wide, and the web components 304, 306 are about ³⁄₁₆ inches thick and 10¹⁄₁₆ inches in height, and about 35¾ inches wide. In some embodiments, the rear bolster 110, web components 304, 306, gussets 310, and stiffeners 312 are made out of metal or a metal alloy. In another embodiment, the rear bolster 110 has an overall geometric envelope of about 96 inches in length, about 7 inches in width, and about 7 inches in height, and the thickness may be about 8 gauge thick.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A lightweight trailer, comprising:
a front bolster at a front of the trailer;
a rear bolster at a rear of the trailer, wherein the rear bolster comprises a top side and a rear side, and wherein:
the top side comprises:
a first gusset;

a second gusset, the first gusset and the second gusset positioned at a gusset plane;

a first top stiffeners positioned at a first top plane; and a second top stiffener positioned at a second top plane;

wherein the first top plane and the second top plane are perpendicular to the gusset plane, and wherein the first top plane is at an angle oblique to the second top plane; and the rear side comprises:

a first web component;

a second web component, the first web component and the second web component positioned at a web plane;

a first rear stiffener positioned at a first rear plane; and a second rear stiffener positioned at a second rear plane;

wherein the first rear plane and the second rear plane are perpendicular to the web plane, and wherein the first rear plane is at an angle oblique to the second rear plane;

a chassis, comprising:

a first beam extending from the front of the trailer to the rear of the trailer, wherein the first beam comprises an I-beam cross-sectional shape;

a second beam extending from the front of the trailer to the rear of the trailer, wherein the second beam comprises an I-beam cross-sectional shape; and one or more cross-members perpendicular to the first beam and the second beam, wherein the one or more cross-members are placed between the first beam and the second beam, and wherein the one or more cross-members extend from the front of the trailer to the rear of the trailer;

landing gear, wherein the landing gear may be in a deployed or undeployed state;

one or more suspension axles;

two or more wheels; and two or more tires.

2. The trailer of claim 1, wherein the first beam and the second beam each comprises a first beam section and a second beam section.

3. The trailer of claim 2, wherein:

the first beam section comprises:

a first web height;

a first web thickness;

a first flange width; and a first flange thickness; and the second beam section comprises:

a second web height;

a second web thickness;

a second flange width; and a second flange thickness.

4. The trailer of claim 3, wherein the first beam and the second beam each further comprises a transition beam section between the first beam section and the second beam section.

5. The trailer of claim 4, wherein the first beam section is parallel to the second beam section, and wherein the first beam section is offset from the second beam section.

6. The trailer of claim 5, wherein the first web height is less than the second web height and the first flange width is greater than the second flange width.

7. The trailer of claim 5, wherein the first web height is less than the second web height, and wherein the first flange width is less than the second flange width.

8. The trailer of claim 5, wherein the first beam and the second beam each further comprises one or more apertures.

9. The trailer of claim 8, wherein the one or more apertures of the first beam and the second beam are used in conjunction with a fastener for securing a load to the trailer.

10. The trailer of claim 5, wherein:

the first web height is about 4.5 inches to about 6 inches;

the first web thickness is about 8-gauge;

the first flange width is about 4 inches;

the first flange thickness is about ¼ inch;

the second web height is about 6 inches to about 10 1/16 inches;

the second web thickness is about ⅛ inch;

the second flange width is about 3 inches; and the second flange thickness is about ¼ inch.

11. A lightweight trailer, comprising:

a front bolster at a front of the trailer;

a rear bolster at a rear of the trailer, wherein the rear bolster comprises a top side and a rear side, and wherein:

the top side comprises:

a first gusset;

a second gusset, the first gusset and the second gusset positioned at a gusset plane;

a first top stiffeners positioned at a first top plane; and a second top stiffener positioned at a second top plane;

wherein the first top plane and the second top plane are perpendicular to the gusset plane, and wherein the first top plane is at an angle oblique to the second top plane; and the rear side comprises:

a first web component;

a second web component, the first web component and the second web component positioned at a web plane;

a first rear stiffener positioned at a first rear plane; and a second rear stiffener positioned at a second rear plane;

wherein the first rear plane and the second rear plane are perpendicular to the web plane, and wherein the first rear plane is at an angle oblique to the second rear plane;

a chassis, comprising:

a front bolster at the front of the trailer;

a rear bolster at the rear of the trailer; and one or more cross-members, wherein the one or more cross-members extend from the front of the trailer to the rear of the trailer;

landing gear, wherein the landing gear may be in a deployed or undeployed state;

one or more suspension axles;

two or more wheels; and two or more tires.

12. The trailer of claim 11, wherein the rear bolster comprises one or more apertures.

13. The trailer of claim 12, wherein the front bolster comprises one or more apertures.

14. The trailer of claim 13, wherein the one or more apertures of the rear bolster are used in conjunction with a fastener for securing a load to the trailer.

15. The trailer of claim 14, wherein the one or more apertures of the front bolster are used in conjunction with a fastener for securing a load to the trailer.

16. A trailer, comprising:

a chassis, comprising:

a front beam section, comprising:
   a front web height of about 4.5 inches;
   a front web thickness of about 8-gauge;
   a front flange width of about 4 inches; and
   a front flange thickness of about ¼ inch;
a middle beam section, comprising:
   a middle web height of about 6 inches;
   a middle web thickness of about ⅛ inch;
   a middle flange width of about 3 inches; and
   a middle flange thickness of about ¼ inch;
a rear beam section, comprising:
   a rear web height of about 10¹/₁₆ inches;
   a rear web thickness of about ⅛ inch;
   a rear flange width of about 3 inches; and
   a rear flange thickness of about ¼ inch,
wherein the front beam section, the middle beam section, and the rear beam section together comprise a beam;
one or more cross-members, wherein the one or more cross-members are arranged perpendicular to the front beam section, the middle beam section, and the rear beam section;
a front bolster, comprising:
   a front bolster width of about 6 inches;
   a front bolster height of about 7.15 inches; and
   a front bolster thickness of about 8-gauge;
a rear bolster comprising a top side and a rear side, wherein:
   the top side comprises:
      a first gusset;
      a second gusset, the first gusset and the second gusset positioned at a gusset plane;
      a first top stiffeners positioned at a first top plane; and
      a second top stiffener positioned at a second top plane;
      wherein the first top plane and the second top plane are perpendicular to the gusset plane, and wherein the first top plane is at an angle oblique to the second top plane; and
   the rear side comprises:
      a first web component;
      a second web component, the first web component and the second web component positioned at a web plane;
      a first rear stiffener positioned at a first rear plane; and
      a second rear stiffener positioned at a second rear plane;
      wherein the first rear plane and the second rear plane are perpendicular to the web plane, and wherein the first rear plane is at an angle oblique to the second rear plane;
landing gear, wherein the landing gear may be in a deployed or undeployed state;
one or more suspension axles;
two or more wheels; and
two or more tires.

17. The trailer of claim 16, wherein the rear web height is about 10¾ inches, the rear web thickness is about ¼ inch, the rear flange width is about 4 inches.

* * * * *